(Model.)
H. R. CLARK.
NUT LOCK.
No. 532,027. Patented Jan. 8, 1895.
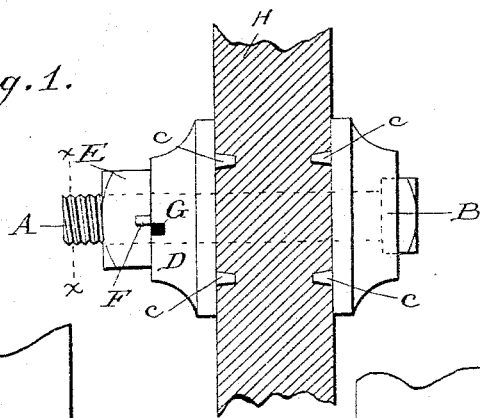
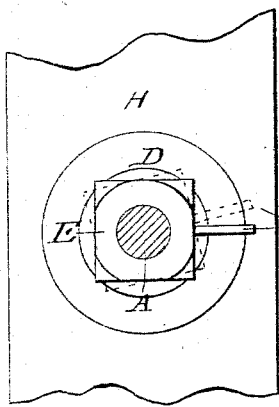 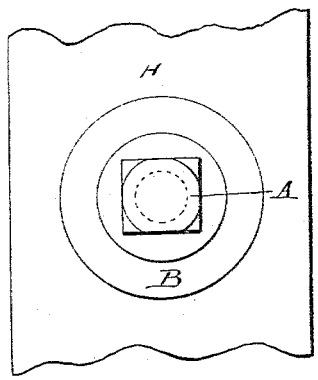
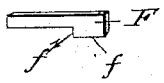
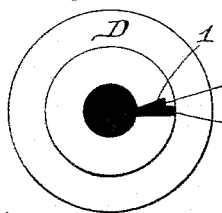 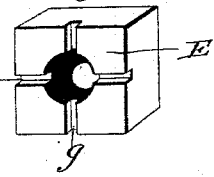 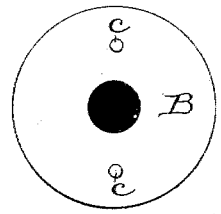
Witnesses:
Albert B. Blackwood.
Carleton E. Snell.
Inventor:
Hugh R. Clark
by J. H. Soulé and Co.
Attorneys.

UNITED STATES PATENT OFFICE.

HUGH R. CLARK, OF SAVANNAH, MISSOURI.

NUT-LOCK.

SPECIFICATION forming part of Letters Patent No. 532,027, dated January 8, 1895.

Application filed October 9, 1893. Serial No. 487,584. (Model.)

*To all whom it may concern:*

Be it known that I, HUGH R. CLARK, of Savannah, in the county of Andrew and State of Missouri, have invented certain new and useful Improvements in Nut-Locks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to means for securing a screw-nut in place upon a bolt and preventing its accidental unscrewing, and the invention consists in an improved construction of such securing means which will give perfect security while possessing the requisite simplicity, cheapness and durability.

The invention is illustrated in the accompanying drawings, wherein—

Figure 1 is a side view of a nut and washers applied to a bolt and secured by the improved lock. Fig. 2, is a transverse section across the bolt indicating the locking movement of the locking key. Fig. 3, is a face view of the head of the bolt and the outer washer. Fig. 4, is a detail perspective view of the locking key. Fig. 5, is a face view of the inner washer. Fig. 6, is a perspective view of the nut; and Fig. 7, is a plan view of the under side of one of the washers.

In the drawings, A, is an ordinary square-head bolt, and H, represents a beam or other piece or structure through which the bolt passes.

B, and D, are metallic washers through which the bolt passes on the opposite sides of the piece H, the outer washer B, bearing against one side of the piece H and providing a seat for the bolt-head, and the inner washer D bearing against the opposite side of the piece H and constituting the surface against which the nut E is screwed. Each washer is provided on its under side with projecting points *c c* which enter the piece H and prevent the rotation of the washers, and the washer B has a square countersunk recess for the bolt-head which prevents the rotation of the bolt after it has been completely inserted.

The nut E and inner washer D have recesses *g*, G, respectively on their adjacent surfaces, with which co-operates a locking key F, the said key and recesses serving to lock the nut in the manner indicated in the description following.

The key F is a little rectangular piece of metal having at one edge a rectangular projecting bit *f* which extends only a portion of the length of the key and forms a square shoulder *f'*.

The nut E has on its under surface one or more radial recesses or grooves *g* (see Fig. 6) and the adjacent washer D has on its outer surface the recess G. (See Fig. 5.) Each recess or groove *g* of the nut E is of the same width as the key F from side to side, and the depth of the recess is equal to the breadth of the stem of the key exclusive of the projecting bit *f*.

The recess G in the face of washer D is of the same width (at its mouth) as recess *g*, and its depth is equal to the extent of projection of the bit *f* of the key. Consequently when the recess G and one of the recesses *g* are brought together so as to register, the key F can be inserted between the nut and washer, the stem of the key entering the recess *g* and the bit *f* entering the recess G. The recess G has a notch at one side, back of its mouth which forms a square shoulder 2, and after the key F has been inserted the nut E can be turned off a little in the direction of unscrewing which will carry the bit *f* of the key back into the notch of recess G so that the shoulder *f'* of the key will pass behind the shoulder 2 of the recess. The inner wall 1 of the recess of course prevents the further rotation of the nut. The stem of the key is firmly held by the recess *g* so that when the nut is turned there is no independent movement of the key but the key is carried around bodily with the nut until its bit *f* comes in contact with the wall of the recess. The bit *f* is the only portion of the key which projects inward to co-operate with the locking recess G. The recess *g* in the nut simply holds the nut and key rigidly associated, so that the nut will carry the key into engagement with the locking notch of recess G, and so that the key will then hold the nut from further rotation.

The essential character of the locking recess G is that it permits the insertion of the key-bit and then permits the slight turning off of the nut to secure the key, the inner wall 1 of the recess constituting a stop which limits the rotation of the nut, and the shoulder 2 constituting a guard which prevents the withdrawal of the key when the bit has been turned against the stop 1. Any other equivalent formation of the washer which will provide such a stop and guard for the bit of the key will manifestly answer the purpose of the invention.

There are illustrated four of the radial recesses or grooves $g$ in the nut, these being ninety degrees apart. Of course only one of the recesses $g$ is needed in the locking of the nut, and their number is immaterial except that there are preferably several at different points so that one of them can in every case be brought into register with recess G while the nut is screwed up close to the washer D.

The adjacent margins of the nut and washer preferably coincide, so that the mouths of recesses $g$, G, are in the same plane. The stem of key F preferably extends outward beyond the mouth of the recess $g$ to aid in withdrawing the key if it is desired to unlock and remove the nut.

The groove in the nut is made no wider than the thickness of the thin key F, and the entire recess in the washer need be only large enough to permit the entrance and subsequent slight lateral movement of the locking-bit $f$. This makes a very neat construction because all the co-operating locking parts are concealed and only the little projecting handle of the key and the narrow mouth of the recess in the washer are visible. (See Fig. 1.) The stem of the key being entirely above the plane of the washer, its projecting handle end is entirely free and can be easily grasped to withdraw the key with the fingers, or with pinchers if it has rusted at the mouth of its groove. The bit and its locking notch, it will be noted, are covered and not much exposed to wet and rust.

I am aware of the patent of Peterson and Coulter, No. 127,509, dated June 4, 1872, and I do not claim anything disclosed thereby. The present invention is primarily distinguished from the construction shown in said patent by the fact that in the construction embodying the present invention only the locking bit of the key projects into engagement with the locking recess, said locking bit and the parts with which it engages are entirely covered and concealed by the nut, and the locking key has no independent locking movement, but when inserted is rigidly connected with the nut so as to be carried bodily thereby. The superior advantages of the present improved construction will appear from the description foregoing.

I claim as my invention—

1. A bolt-nut, and a stationary washer D against which said nut is screwed, said nut and washer having the registering open-ended recesses $g$ G in their adjacent faces, the recess G of the washer being notched back of its mouth to form a concealed shoulder 2, in combination with a locking key F for said nut formed with a shoulder $f'$ at one edge, said locking key entering edgewise through the open ends of said registering recesses $g$ G, one edge of said key fitting closely in the recess in the nut while its shouldered edge enters the recess G in the washer, said key having no independent locking movement but being free to rotate with said nut until said shoulder $f'$ of the key is carried behind and into engagement with the concealed shoulder 2 of recess G, substantially as set forth.

2. The combination of the bolt A held from rotation, the nut E therefor having key-groove $g$, the stationary washer D against which said nut is screwed having the open-ended recess G with which said key-groove registers and at one side of said recess and back of its open end a locking notch covered and concealed by said nut, and the locking key F having a stem portion fitting said key-groove $g$ and having a bit $f$ projecting from said key-groove, co-operating with said recess G, and adapted to be turned by said nut into said locking notch, substantially as set forth.

HUGH R. CLARK.

Witnesses:
JOHN L. BEAGHLER,
JOHN A. CLARK, Sr.